United States Patent
Benito-Navazo

(10) Patent No.: US 6,188,024 B1
(45) Date of Patent: *Feb. 13, 2001

(54) ELBOW FOR THE ANGULAR CONNECTION OF TWO STRETCHES OF RACEWAY FOR ELECTRICAL CABLE SYSTEM

(75) Inventor: Juan Manuel Benito-Navazo, Sant Cugat Del Valles (ES)

(73) Assignees: Aparellaje Electrico, S.A.; L'Hosptalet De Llobregat, both of (ES)

(*) Notice: Under 35 U.S.C. 154(b), the term of this patent shall be extended for 0 days.

This patent is subject to a terminal disclaimer.

(21) Appl. No.: 09/236,286

(22) Filed: Jan. 22, 1999

(30) Foreign Application Priority Data

Feb. 3, 1998 (ES) .................................................. 9800198

(51) Int. Cl.[7] ........................................................ H02G 3/04
(52) U.S. Cl. ............................ 174/97; 220/340; 138/111; 138/115; 138/162; 138/166; 174/101; 174/99 R
(58) Field of Search .............................. 174/97, 95, 99 R, 174/101, 68.3; 138/166, 162, 115, 111; 220/340

(56) References Cited

U.S. PATENT DOCUMENTS

| | | | |
|---|---|---|---|
| 3,003,794 | * 10/1961 | Burley | 285/121 |
| 3,697,667 | * 10/1972 | Pollak et al. | 174/68 C |
| 4,398,564 | * 8/1983 | Young et al. | 138/92 |
| 4,423,284 | * 12/1983 | Kaplan | 174/101 |
| 4,951,716 | * 8/1990 | Tsunoda et al. | 138/162 |
| 5,024,251 | * 6/1991 | Chapman | 138/92 |
| 5,089,667 | * 2/1992 | Goussin et al. | 174/101 |
| 5,134,250 | * 7/1992 | Caveney et al. | 174/101 |
| 5,469,893 | * 11/1995 | Caveney et al. | 138/162 |
| 5,709,249 | * 1/1998 | Okada et al. | 138/162 |
| 5,957,414 | * 9/1999 | Perrignon De Troyes et al. | 248/27.1 |

* cited by examiner

Primary Examiner—Kristine Kincaid
Assistant Examiner—W. David Walkenhorst
(74) Attorney, Agent, or Firm—Staas & Halsey LLP

(57) ABSTRACT

Each raceway stretch includes a base section, external walls; one or more compartment walls providing for the existence of sub-raceways, folds capping the walls and forming longitudinal slots and a cover section for each sub-raceway. The internal bottom surfaces of each base section are coplanar and have juxtaposable end cuts over the whole extension thereof. The elbow includes for each sub-raceway, an angled closing member having skirts engageable simultaneously in longitudinal slots of both raceway stretches, closing portions of a sub-raceway of each stretch; and a covering member which, in said active position, covers said angled closing members from above and is provided with means for engagement with said base sections.

9 Claims, 2 Drawing Sheets

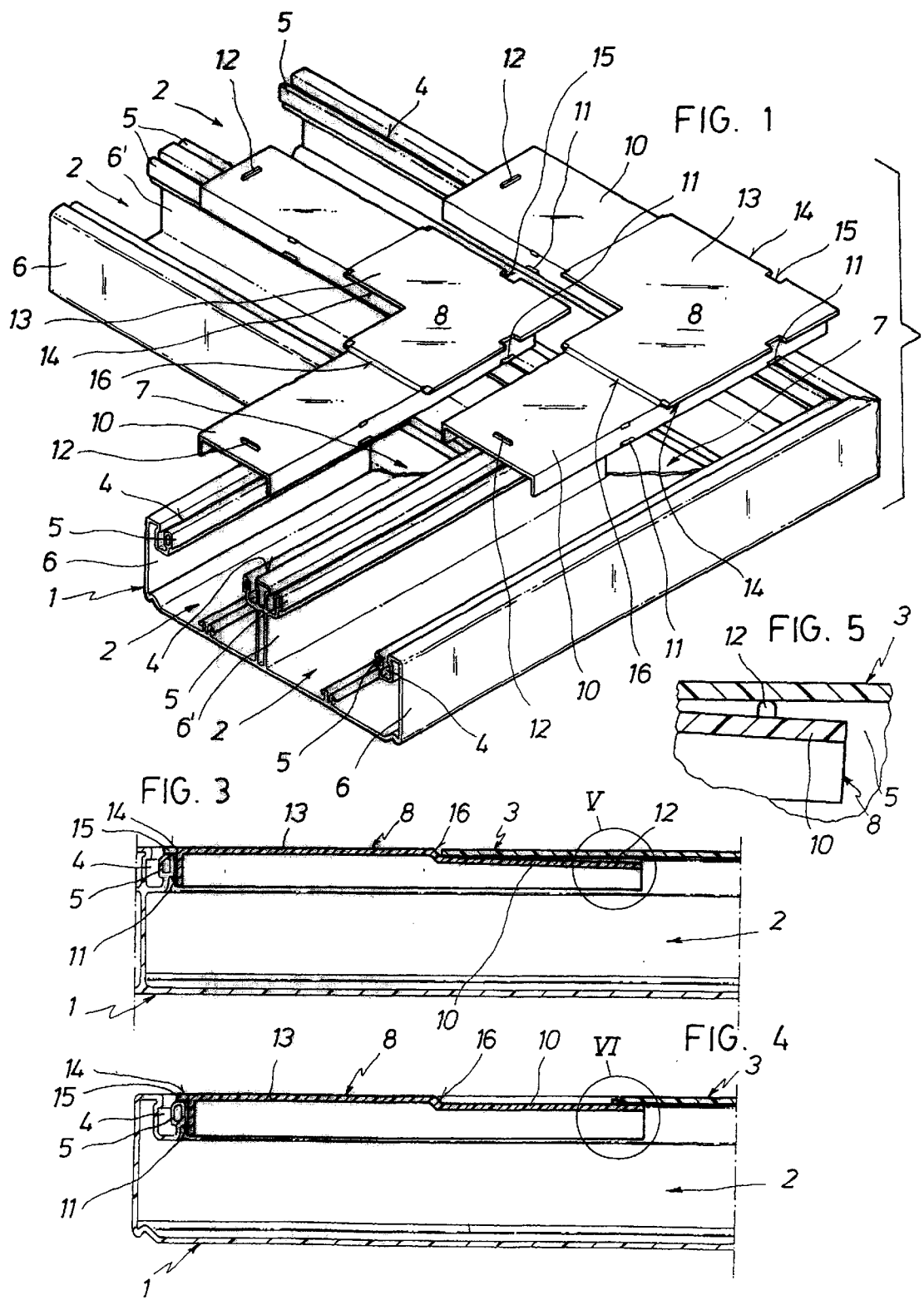

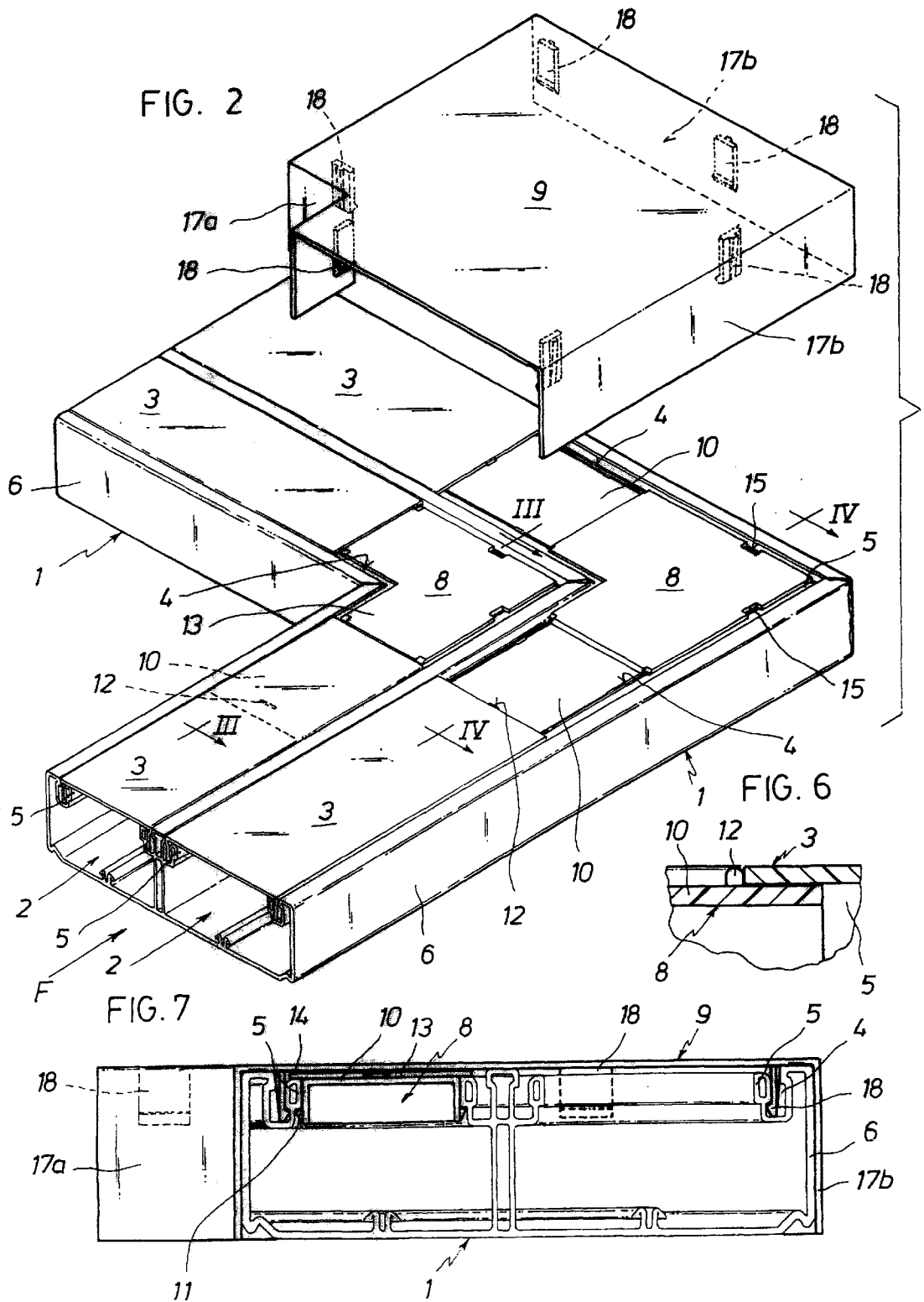

ELBOW FOR THE ANGULAR CONNECTION OF TWO STRETCHES OF RACEWAY FOR ELECTRICAL CABLE SYSTEM

BACKGROUND AND SUMMARY OF THE INVENTION

The present invention relates to an elbow for the angular connection of two stretches of raceway for electrical cable systems, each of said raceway stretches comprising: [i] a base section defining an internal bottom surface; external walls; at least one compartment wall providing for the existence of at least two sub-raceways, said walls being provided at the top end thereof with folds forming longitudinal slots; and [ii] a cover section for each of said at least two sub-raceways, provided with lateral skirts adapted to be inserted in said longitudinal slots; said internal bottom surfaces of each of said base sections: [a] being substantially coplanar and [b] having respective substantially juxtaposable end cuts over the whole extension thereof, said elbow being suitable for occupying an active position in which it establishes a connection between said two raceway sections.

In the case of non-compartmented raceways, a regular practice of the installation engineers is to mitre the ends of the base and cover sections of each stretch and fit them together directly, without using any item to cover and hide the slits and defects proper to the manual cut in a haphazard fit. Nevertheless, angled covering members, which are snap fitted on the fitting arrangements described, have been used in certain cases.

In other cases, the use is also known of accessories for forming flat elbows in the form of an angled base member which is capable of being assembled to the raceway base sections and is provided with an angled covering member to close the elbow in a way attachable to the raceway cover sections.

Solutions similar to the above disclosed have been applied to compartmented raceways, with the exception that the angled base member is provided with compartments mating with those of the raceway, the angled covering member being unique and identical to the above mentioned one.

The above cases have the serious drawback that, when the angled covering member or equivalent item is removed, all the electrical cables of the different compartments are uncovered and made accessible. Thus, the electrical cables that should not be disturbed while those that should be are being manipulated may not be isolated and protected.

It is an object of the invention to overcome the above-mentioned drawback. This object is achieved by an elbow of the type first mentioned above, which is characterized in that it comprises [α] for each sub-raceway, an angled closing member having skirts which, in said active position, engage simultaneously in longitudinal slots of both raceway stretches, closing portions of a sub-raceway of each stretch from above; and [α] a covering member which, in said active position, covers said angled closing members from above and is provided with means for engagement with said base sections.

In this way, the compartments containing electrical cables which should not be disturbed are maintained closed, at the same time it allows the compartments containing the electrical cables that should be modified to become accessible.

Further advantages and features of the invention will be appreciated from the following description in which there is disclosed a preferred embodiment of the invention without any limiting scope and with reference to the accompanying drawings, in which:

BRIEF DESCRIPTION OF THE DRAWINGS

FIG. 1 is an exploded perspective view of two stretches of raceway, each provided with two sub-raceways and of the corresponding angled closing members.

FIG. 2 is an exploded perspective view, similar to FIG. 1, of the covering member and of both raceways stretches, with the angled closing members in place.

FIG. 3 is a cross section view on the line III—III of FIG. 2.

FIG. 4 is a cross section view on the line IV—IV of FIG. 2.

FIG. 5 is a view on a larger scale of the detail in the ring identified as V in FIG. 3.

FIG 6 is a view on a larger scale of the detail in the ring identified as VI in FIG. 3.

FIG. 7 is an elevation view, in the direction of the arrow F in FIG. 2, of the elbow according to the invention in the active position thereof.

DESCRIPTION OF THE PREFERRED EMBODIMENT

The elbow according to the invention, as stated above, is for use with raceways for housing electrical cable systems comprising a base section 1 having an internal bottom surface and which is compartmented longitudinally in two or more sub-raceways 2 of the same or different width. These raceways also comprise a cover section 3 for each sub-raceway and each cover section 3 is provided with lateral skirts to allow for engagement of both sections 1, 3 by insertion of the said skirts in longitudinal slots 4 provided contiguously to folds 5 capping the external walls 6 and the compartment walls 6' of the base section 1. These raceways may assume positions in which the respective bottom surfaces are coplanar and have end cuts 7, such that both end cuts of each raceway may be juxtaposed over the whole extension of both.

The elbow of the invention comprises, for each sub-raceway 2, a flattened angled closing member 8 which forms a closed conduit with the walls 6, 6' and the internal bottom surfaces of the base section 1 (which are obviously also internal bottom surfaces of the sub-raceways 2), which conduit may be opened for the passage of the electrical cable systems.

Hereinafter, the position in which the elbow is duly engaged for connecting both raceway stretches will be called the active position of the elbow or of the members constituting it. These angled closing members 8 are provided with skirts which, in the said active position of the elbow, penetrate in the longitudinal slots 4 of both raceway stretches. The elbow also comprises a covering member 9 which, in the said active position, covers from above both angled closing members 8 and is provided with means for engagement with the base sections. Further reference will be made to these engagement means.

The angled closing member 8 preferably comprises an outstanding centre portion 13 and two channel-like portions 10 disposed as extensions of two contiguous sides of the centre portion 13. A step 16, defining a first height, is provided between each channel-like portion 10 and the outstanding centre portion 13. In the said active position, the channel-like portions 10 have the concavity thereof is directed towards the interior of the sub-raceways 2 of the base sections 1. It is contemplated that the channel-like portion 10 be provided, in end portions of the skirts thereof, with barbed teeth 11 which, in the said active position, engage the folds 5, whereby the angled member 8 is removably retained in the base sections 1.

The angled closing members 8 are also preferably provided with a transverse tab 12 extending from the outer surface thereof and which is situated close to the free edge of the channel-like portion 10. The height of the transverse tab 12 is slightly lower than the first height of the step 16 and is of the order of the thickness of the cover section 3.

The outstanding centre portion 13 forms visors 14 extending laterally and which may bear against the folds 5 of the base sections 1 in the said active position, covering the corresponding portion of the longitudinal slots 4. The longer visors have cutaway portions 15 leaving the longitudinal slots 4 uncovered and providing access to the barbed teeth 11.

The channel-like portion 10, which is in cantilever relationship to the outstanding centre portion 13, is sufficiently resilient for a cover section 3 to be able to deform it, by flexing it, when the cover section 3 is engaged in the base section 1, such that the cover section 3 is mounted on the transverse tab 12, as may be appreciated in FIGS. 3 and 5, pressing thereagainst.

In all cases, the width of the channel-like portion 10 of the angled closing members 8 is of a smaller dimension than the corresponding internal width of the cover sections 3, whereby the channel-like portion may be comprised between the skirts of a cover section 3.

The covering member 9 is provided with a flat upper surface, the edges of which are straight and each of these edges is disposed at rightangles to the two immediate edges. Two of these edges are short and form a re-entrant angle, i.e. the apex thereof is closer to the centre region of the covering member.

The short edges are provided with respective skirts 17*a* and the two edges facing the short edges are also provided with skirts 17*b*. Internally, the covering member 9 is also provided with barbed flanges 18, situated in parallel with the skirts 17*a*, 17*b*. In the active position of the elbow, they pass through the cutaway portions 15 and penetrate in the longitudinal slots 4, whereby the covering member 9 is removably retained in the base sections 1.

The transverse tab 12 and the end steps 16 situated between the outstanding centre portion 13 and the channel-like portion 10 may form stops for the cover sections 3. Therefore, since both cover sections 3 of each sub-raceway 2 are the same (provided always that the sub-raceways 2 are of the same width), the angled closing members 8 may be the same both for the sub-raceway situated on the inside of the elbow and for the remaining sub-raceway, which reduces the number of parts required for closing the elbow.

What I claim is:

1. An elbow for the angular connection of two stretches of raceway for electrical cable systems, each of said raceway stretches comprising; a base section defining an internal bottom surface; external walls; at least one compartment wall providing for the existence of at least two sub-raceways, said external and compartment walls being provided at the top end thereof with folds forming longitudinal slots; and a cover section for each of said at least two sub-raceways, provided with lateral skirts adapted to be inserted in said longitudinal slots; said internal bottom surfaces of each of said base sections; being coplanar and having respective juxtaposable end cuts over the whole extension thereof; said elbow being suitable to occupy an active position in which it establishes a connection between said two raceway stretches, characterized in that it comprises for each sub-raceway, an angled closing member having skirts which, in said active position, engage simultaneously in longitudinal slots of said raceway stretches, closing portions of said sub-raceway of each stretch from above; and a covering member which, in said active position, covers said angled closing members from above and is provided with means for engagement with said base sections.

2. An elbow according to claim 1, characterized in that said angled closing member is provided with an outstanding centre portion and two channel-like portions as extensions of said outstanding centre portion, a step being provided between each of said channel-like portions and said centre portion, defining a first height.

3. An elbow according to claim 2, characterized in that each of said channel-like portions of said angled closing member is provided with a transverse tab extending upwardly therefrom and having a second height slightly lower than said first height.

4. An elbow according to claim 3, characterized in that said channel-like portion is adapted to flex slightly allowing said transverse tab of said channel-like portion to be engaged against said cover section in said active position.

5. An elbow according to claim 2, characterized in that each of said channel-like portion is adapted to be positioned between said skirts of said cover section in said active position.

6. An elbow according to claim 1, characterized in that said skirts of said angled closing member are provided with barbed teeth which, in said active position, are retentively engaged in said folds.

7. An elbow according to claim 6, characterized in that said outstanding centre portion of said angled closing member forms a visor extending laterally, which bears against said folds in said active position, said visor having at least one cutaway portion providing access to the barbed teeth.

8. An elbow according to claim 1, characterized in that said covering member: is provided with a flat upper surface having straight edges forming right angles with each other, two of said straight edges forming a re-entrant angle and respectively facing two opposite edges; said two edges forming the re-entrant angle and said two opposite edges being provided with respective skirts; and is provided internally with barbed flanges which, in said active position, pass through said cutaway portions acceding to said longitudinal slots.

9. A connection elbow to connect raceway stretches, each of said raceway stretches comprising at least two external walls and at least one compartment wall forming at least two sub-raceways, said external and compartment walls being provided with folds forming longitudinal slots; said connection elbow comprising: an angled closing member for each of said sub-raceways having skirts which, in an active position, engage simultaneously in longitudinal slots of said raceway stretches, closing portions of said sub-raceways of each raceway stretch from above; and a covering member which, in said active position, covers said angled closing members from above.

* * * * *